United States Patent
Marzullo et al.

(10) Patent No.: US 9,484,582 B2
(45) Date of Patent: Nov. 1, 2016

(54) FUEL CELL CATALYST TREATMENT

(71) Applicant: Audi AG, Ingolstadt (DE)

(72) Inventors: Jesse M. Marzullo, Enfield, CT (US);
Elise Lorraine Izzo, Windsor, CT (US);
Robert Mason Darling, South Windsor, CT (US)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/650,846

(22) PCT Filed: Jan. 8, 2013

(86) PCT No.: PCT/US2013/020606
§ 371 (c)(1),
(2) Date: Jun. 9, 2015

(87) PCT Pub. No.: WO2014/109729
PCT Pub. Date: Jul. 17, 2014

(65) Prior Publication Data
US 2015/0318559 A1    Nov. 5, 2015

(51) Int. Cl.
| | |
|---|---|
| B01J 37/00 | (2006.01) |
| B01J 37/06 | (2006.01) |
| B01J 37/08 | (2006.01) |
| H01M 4/88 | (2006.01) |
| H01M 4/90 | (2006.01) |
| H01M 4/92 | (2006.01) |

(52) U.S. Cl.
CPC .............. *H01M 4/88* (2013.01); *H01M 4/9083* (2013.01); *H01M 4/926* (2013.01); *Y02E 60/50* (2013.01)

(58) Field of Classification Search
CPC .. B01J 35/0033; B01J 37/00; B01J 37/0203; B01J 37/0219; B01J 37/0221; B01J 37/0236; B01J 37/06; B01J 37/08; B01J 37/084; H01M 4/88; H01M 4/9091
USPC ................................ 502/100, 300, 512, 101
See application file for complete search history.

(56) References Cited

U.S. PATENT DOCUMENTS

| | | | | |
|---|---|---|---|---|
| 3,260,677 | A | * | 7/1966 | Riley et al. .............. B01J 23/22 502/167 |
| 3,781,224 | A | * | 12/1973 | Ferlazzo et al. ......... B01J 23/48 502/10 |
| 2002/0111268 | A1 | | 8/2002 | Lee et al. |
| 2003/0017378 | A1 | | 1/2003 | Ruth et al. |
| 2008/0200741 | A1 | | 8/2008 | Kowaleski |

FOREIGN PATENT DOCUMENTS

| | | |
|---|---|---|
| JP | 2006-231266 A | 9/2006 |
| KR | 10-2013-0001876 A | 1/2013 |

OTHER PUBLICATIONS

International Search Report, mailed Sep. 30, 2013, for International Application No. PCT/US2013/020606, 3 pages.

\* cited by examiner

*Primary Examiner* — Patricia L Hailey
(74) *Attorney, Agent, or Firm* — Seed IP Law Group LLP

(57) ABSTRACT

According to an embodiment, a method of preparing a catalyst for a fuel cell component includes soaking catalyst particles in citric acid. The catalyst particles are then rinsed after having been soaked in the citric acid. Catalyst particles are dried after they have been rinsed. When desired, the pre-treated catalyst particles may be incorporated into a catalyst ink used for making a fuel cell component.

22 Claims, 2 Drawing Sheets

FUEL CELL CATALYST TREATMENT

BACKGROUND

Fuel cells facilitate an electrochemical reaction for generating electricity. One of the important aspects of a fuel cell is the efficiency of the catalyst. Fuel cell performance, such as current density, may be negatively affected if a catalyst is not able to perform in a desired or optimum manner. There have been a variety of proposals at improving fuel cell catalyst performance.

Other issues associated with fuel cell performance involve water management. For example, oversaturated conditions, especially at low operating temperatures, tend to decrease fuel cell performance. Fuel cell membrane dry out is another contributor to less-than-optimal performance.

SUMMARY

According to an embodiment, a method of preparing a catalyst for a fuel cell component includes soaking catalyst particles in citric acid. The catalyst particles are then rinsed after having been soaked in the citric acid.

According to an embodiment, catalyst particles are dried after they have been rinsed. When desired, the pre-treated catalyst particles may be incorporated into a catalyst ink used for making a fuel cell component.

The various features and advantages of a disclosed example embodiment will become apparent to those skilled in the art from the following detailed description. The drawings that accompany the detailed description can be briefly described as follows.

DETAILED DESCRIPTION

Figure 1:
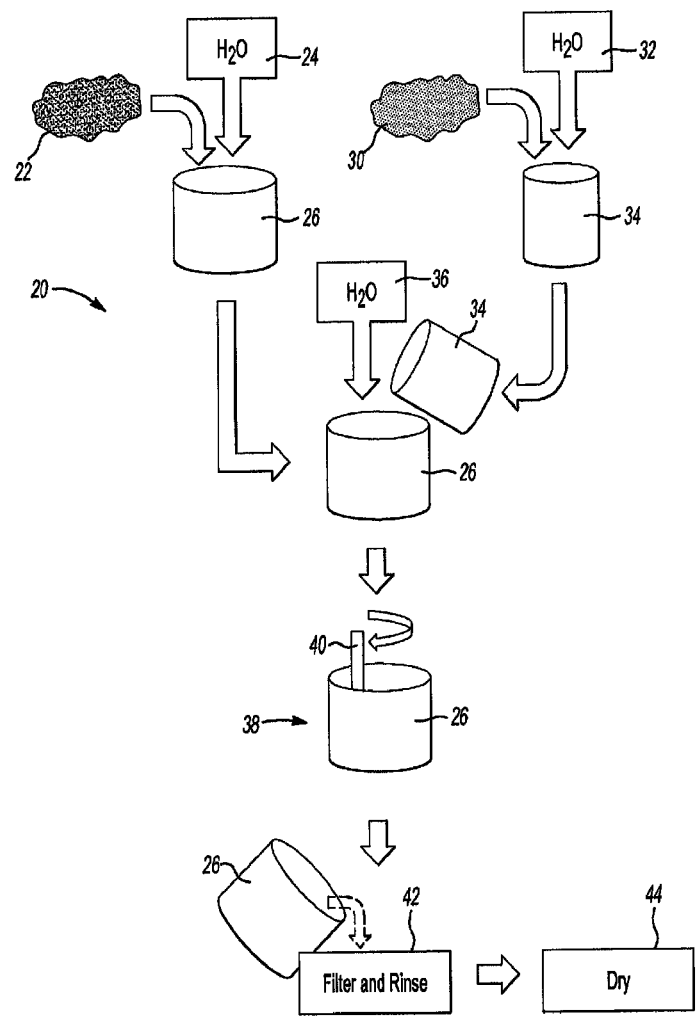
FIG. 1 schematically illustrates an example process for treating a catalyst useful for a fuel cell component.

FIG. 1 schematically illustrates a process 20 for pretreating a catalyst that is useful for making a fuel cell component, such as a catalyst layer that is included in a membrane electrode assembly. Catalyst particles 22 are combined with water 24 in a container 26. In one example, the catalyst particles 22 are commercially available platinum-based catalyst particles. For example, Pt/C catalyst particles are included in one example embodiment.

Citric acid 30 is dissolved in water 32 within another container 34. Additional water 36 is added to the container 26 along with the citric acid from the container 34. In one example, about 1 g of 20% Pt/C catalyst is combined with 400 ml water in the container 26, about 7.5 g citric acid is dissolved in 200 ml water in the container 34 and another 100 ml water 36 is added to yield the mixture in the container 26 as shown at 38.

The mixture including the catalyst particles 22, the citric acid 30 and water 36 within the container 26 is stirred using a stirring device 40. One example includes stirring the mixture for a period of approximately two hours.

After a desired amount of stirring, the mixture is filtered at 42 and the catalyst particles are rinsed. One example includes repeatedly filtering and rinsing the catalyst particles. For example, the original mixture from the container 26 is filtered to separate out the catalyst particles. Those particles are then placed in a water bath and stirred for a period of approximately 30 minutes. That mixture is then filtered and rinsed in another water bath, which is stirred for another thirty minutes. That filtering and rinsing procedure may be repeated several times and, in one example, is performed four consecutive times.

After the rinsing is complete, the catalyst is dried at 44. One example includes drying the catalyst particles in vacuum in an oven using a temperature of approximately 50° C. The drying of the catalyst particles in one example occurs over a period of approximately three days.

Once the catalyst particles that have been treated with citric acid are dry, they may be sieved into catalyst powder and formulated into a catalyst ink. The catalyst ink may then be used in a known manner to establish a fuel cell component. One example fuel cell component made with a catalyst ink including catalyst particles pretreated with citric acid according to the example process shown in FIG. 1 is a catalyst layer of an electrode.

Figure 2:
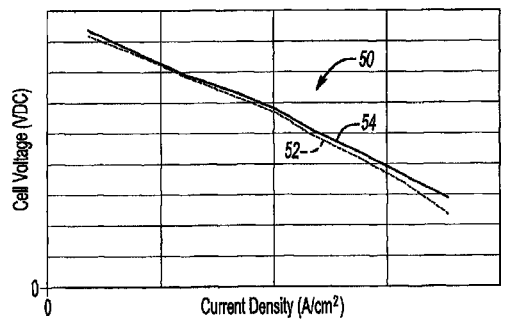
FIG. 2 graphically illustrates a performance characteristic of an example fuel cell component including a catalyst treated according to an embodiment of this invention.

Pre-treating a catalyst using the disclosed process improves fuel cell performance. FIG. 2 includes a graphical illustration 50 of a performance characteristic of a fuel cell including a pre-treated catalyst in at least one fuel cell component such as the catalyst layer. FIG. 2 includes a first plot 52 indicating the performance of a fuel cell including a catalyst, such as a 20% Pt/C catalyst that has not been pre-treated using the process schematically shown in FIG. 1. Another plot 54 shows the fuel cell performance, in terms of current density, using a catalyst that has been pre-treated with citric acid. As can be appreciated from FIG. 2, a higher current density is achieved for a given cell voltage when using a pre-treated catalyst compared to one that has not been pre-treated with citric acid.

Figure 3:
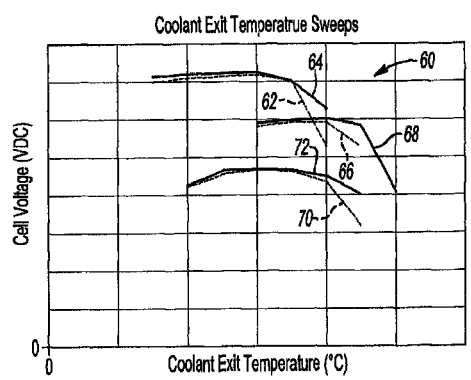
FIG. 3 graphically illustrates another performance characteristic of an example fuel cell component including a catalyst treated according to an embodiment of this invention.

FIG. 3 includes a graphical illustration 60 of another performance characteristic. A first plot 62 of cell voltage for various coolant exit temperatures shows performance using a standard catalyst for a selected current level. A second plot 64 shows cell performance for the same current level using a pre-treated catalyst. As temperature increases, a fuel cell tends to dry out. The improvement in performance seen by comparing the curve 64 to the curve 62 indicates that using a catalyst that is pre-treated with citric acid tends to reduce the amount of drying out within the fuel cell at the higher temperatures. This results in an increase in cell voltage, which is an improvement in performance.

FIG. 3 includes another plot 66 of cell voltage at various coolant exit temperatures for a relatively higher current level compared to that used for establishing the plot 62. The plot 66 corresponds to a fuel cell having a standard catalyst. A comparable plot 68 shows performance at the same current level using a catalyst that has been pre-treated with citric acid. Again, the plot 68 shows an improvement of performance compared to the plot 66, which indicates that the pre-treated catalyst has an associated reduced amount of cell dry out at higher temperatures. Another plot 70 shows the standard catalyst performance at a third, higher current level. The plot 72 shows performance using a pre-treated catalyst at the same, third current level. In each instance shown in FIG. 3, the pre-treated catalyst showed improved performance compared to a standard catalyst.

Figure 4:
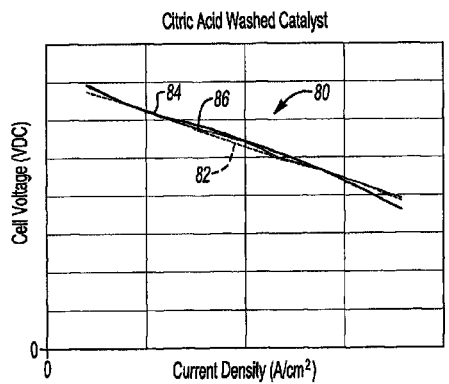
FIG. 4 illustrates another performance characteristic of an example fuel cell component including a catalyst treated according to an embodiment of this invention.

FIG. 4 includes a graphical illustration 80 comparing cell voltage and current density (e.g., another performance characteristic). Three plots 82, 84 and 86 all show the performance level of a fuel cell including a pre-treated catalyst. Each of the plots corresponds to a different operating temperature. As can be appreciated from the illustration, there is only limited difference among the plots 82, 84 and 86. FIG. 4 illustrates that using a catalyst pre-treated with citric acid reduces the sensitivity of fuel cell performance to the operating temperature. This provides an associated fuel cell performance improvement under wet conditions.

There are various aspects of pre-treating a catalyst with citric acid using a procedure like that schematically shown in FIG. 1 and described above. One aspect is that the improvement in performance is an unexpected result. One theory was that citric acid would result in lower performance. As indicated above, pre-treating a catalyst with citric acid surprisingly provides improved performance under a variety of operating conditions, including very cold, saturated conditions.

Another aspect of using a pre-treated catalyst is that there is no tradeoff between wet and dry condition improvements. As shown in FIG. 4, the performance is relatively insensitive to temperature. This allows for an improvement under wet conditions. As shown in FIG. 3, there is an improvement under dry conditions. Prior approaches to attempting to improve catalyst performance typically involved a tradeoff between wet and dry conditions. Some approaches may have provided some improvement under wet conditions while other approaches may have provided some improvement under dry conditions but it has not been believed possible to achieve improvement under both conditions. Using a citric acid pre-treatment according to an embodiment of this invention provides improvement under both conditions without any tradeoff.

The performance improvements shown in FIGS. 2-4 may be attributable to the citric acid acting as a surfactant that facilitates better dispersion of catalyst powder in a catalyst ink used for establishing a fuel cell electrode. Better dispersion of the catalyst powder within a catalyst ink tends to reduce catalyst agglomerates and allows for achieving a thinner ionomer film. Such features may enhance fuel cell performance.

The pre-treatment with citric acid may change the surface functionality of the carbon support (used to establish a catalyst layer). Altering the surface functionality of the carbon support may help disburse it better in a catalyst ink. A change to the surface functionality of the carbon support may also assist in local water management improvements.

Another aspect of pre-treating the catalyst with citric acid is that the citric acid may remove other contaminants that would tend to inhibit performance. The citric acid also may remove free platinous (e.g., $Pt^{2+}$) ions that otherwise could increase the resistance of the ionomer in the catalyst layer.

Another possible aspect associated with pre-treating the catalyst with citric acid includes dissolution and redistribution of the platinum particles to remove particle defects, which leaves a more uniform particle shape with more active sites. Additionally, it may be possible to achieve more uniform particle size distribution, leading to smaller agglomerates and better catalyst ink mixing.

The improved cell performance associated with pre-treating a catalyst using citric acid addresses performance issues such as performance loss under certain temperature conditions and desired water management.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of preparing a catalyst for a fuel cell component, comprising the steps of:
   soaking catalyst particles comprising $Pt^0$ in citric acid; and
   rinsing the catalyst particles after the soaking.

2. The method of claim 1, wherein the soaking comprises mixing the catalyst particles in a liquid; and
   adding the citric acid to the liquid.

3. The method of claim 2, wherein the liquid comprises water.

4. The method of claim 3, wherein the soaking comprises mixing the catalyst particles in a first portion of the water;
   dissolving citric acid in a second portion of the water; and
   mixing the first and second portions of water.

5. The method of claim 1, comprising
   including a first amount of the catalyst particles; and
   including a second amount of the citric acid, wherein the second amount is greater than the first amount.

6. The method of claim 1, wherein the rinsing comprises filtering the catalyst particles;
   rinsing the filtered catalyst particles with water.

7. The method of claim 6, comprising
   repeating the filtering and rinsing with water a plurality of times.

8. The method of claim 1, comprising
   drying the rinsed catalyst particles; and
   preparing a catalyst ink using the dried catalyst particles.

9. The method of claim 8, wherein the drying comprises
   heating the catalyst particles at a temperature of approximately 50° C. for a period of approximately 3 days.

10. The method of claim 1, comprising
    preparing a mixture of the catalyst particles, the citric acid and water;
    stirring the mixture;
    removing the catalyst particles from the mixture;
    rinsing the removed catalyst particles; and
    drying the rinsed catalyst particles.

11. The method of claim 1, wherein the catalyst particles comprise $Pt^0$ supported on carbon.

12. A catalyst prepared by the method, comprising the steps of:
    soaking catalyst particles comprising $Pt^0$ in citric acid; and
    rinsing the catalyst particles after the soaking.

13. The catalyst of claim 12, wherein the soaking comprises
    mixing the catalyst particles in a liquid; and
    adding the citric acid to the liquid.

14. The catalyst of claim 13, wherein the liquid comprises water.

15. The catalyst of claim 14, wherein the soaking comprises
    mixing the catalyst particles in a first portion of the water;
    dissolving citric acid in a second portion of the water; and
    mixing the first and second portions of water.

16. The catalyst of claim 12, wherein the method comprises
    including a first amount of the catalyst particles; and including a second amount of the citric acid, wherein the second amount is approximately 5 times greater than the first amount.

17. The catalyst of claim 12, wherein the rinsing comprises
filtering the catalyst particles;
rinsing the filtered catalyst particles with water.

18. The catalyst of claim 17, wherein the method comprises
repeating the filtering and rinsing with water a plurality of times.

19. The catalyst of claim 12, wherein the method comprises
drying the rinsed catalyst particles; and
preparing a catalyst ink using the dried catalyst particles.

20. The catalyst of claim 19, wherein the drying comprises
heating the catalyst particles at a temperature of approximately 50° C. for a period of approximately 3 days.

21. The catalyst of claim 12, wherein the method comprises
preparing a mixture of the catalyst particles, the citric acid and water;
stirring the mixture;
removing the catalyst particles from the mixture;
rinsing the removed catalyst particles; and
drying the rinsed catalyst particles.

22. The catalyst of claim 12, wherein the catalyst particles comprise $Pt^0$ supported on carbon.

* * * * *